June 16, 1959 J. R. BIRD ET AL 2,891,221
STANDING WAVE INDICATOR
Filed Feb. 24, 1955 3 Sheets-Sheet 1
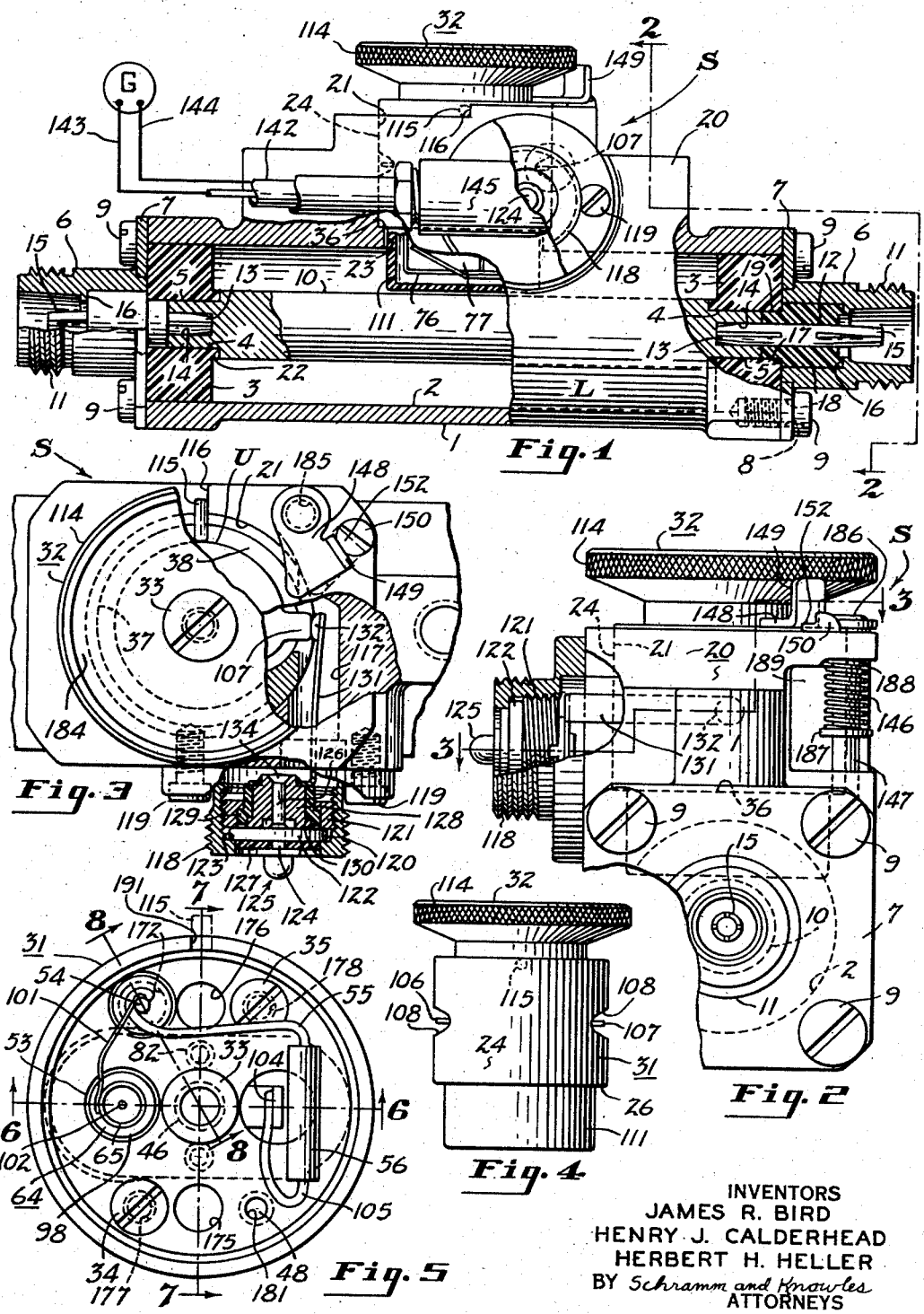
INVENTORS
JAMES R. BIRD
HENRY J. CALDERHEAD
HERBERT H. HELLER
BY Schramm and Knowles
ATTORNEYS

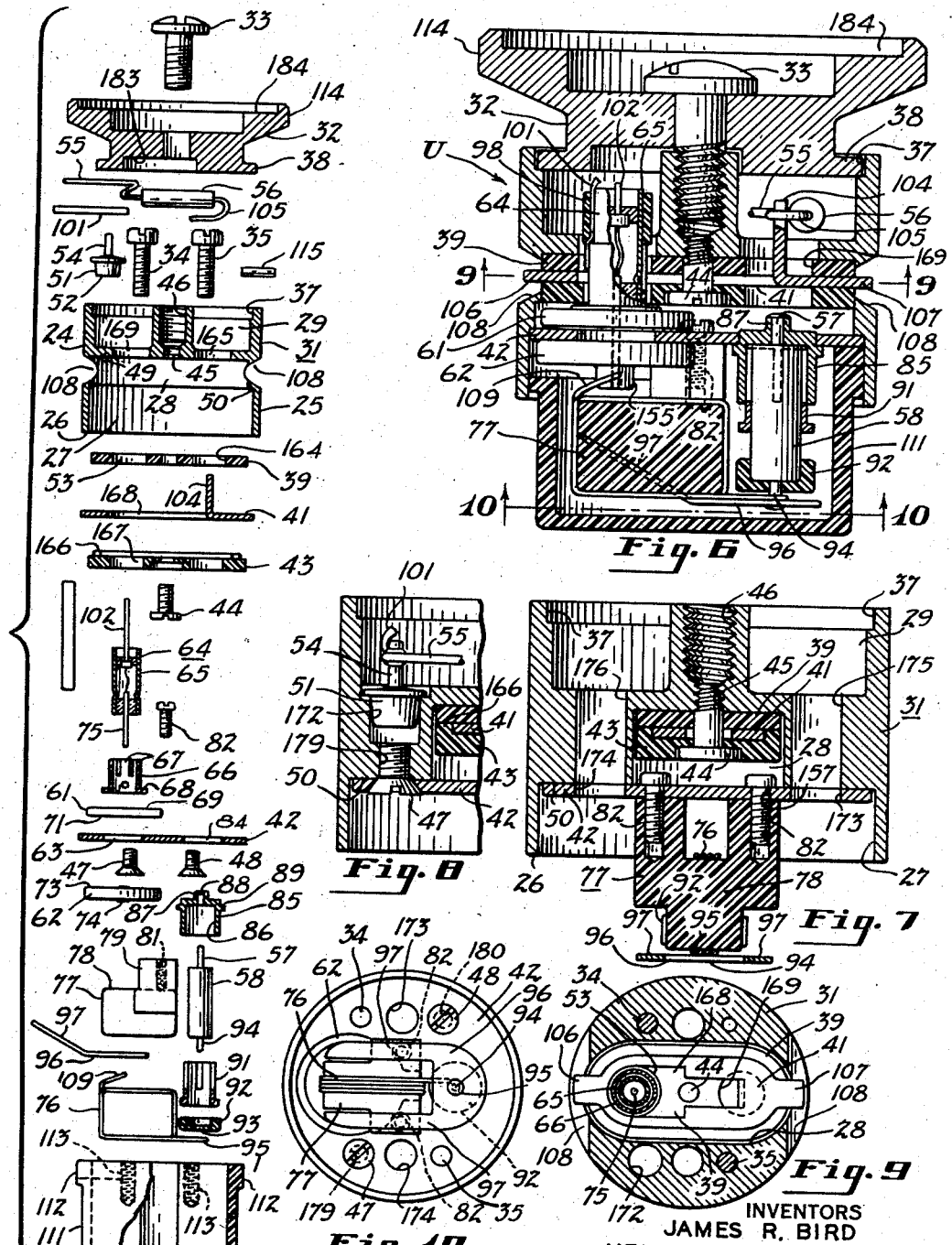

June 16, 1959  J. R. BIRD ET AL  2,891,221
STANDING WAVE INDICATOR
Filed Feb. 24, 1955  3 Sheets-Sheet 3
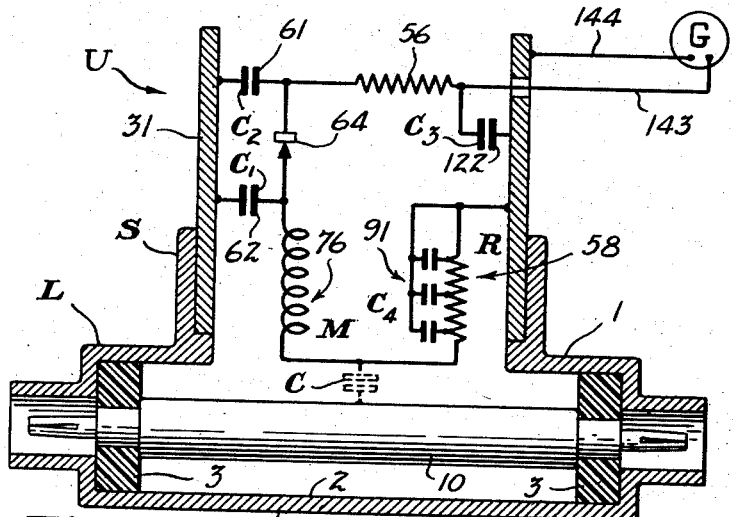
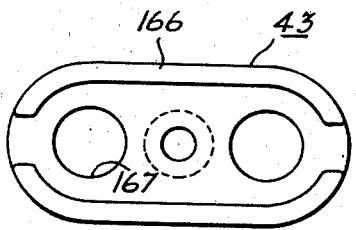
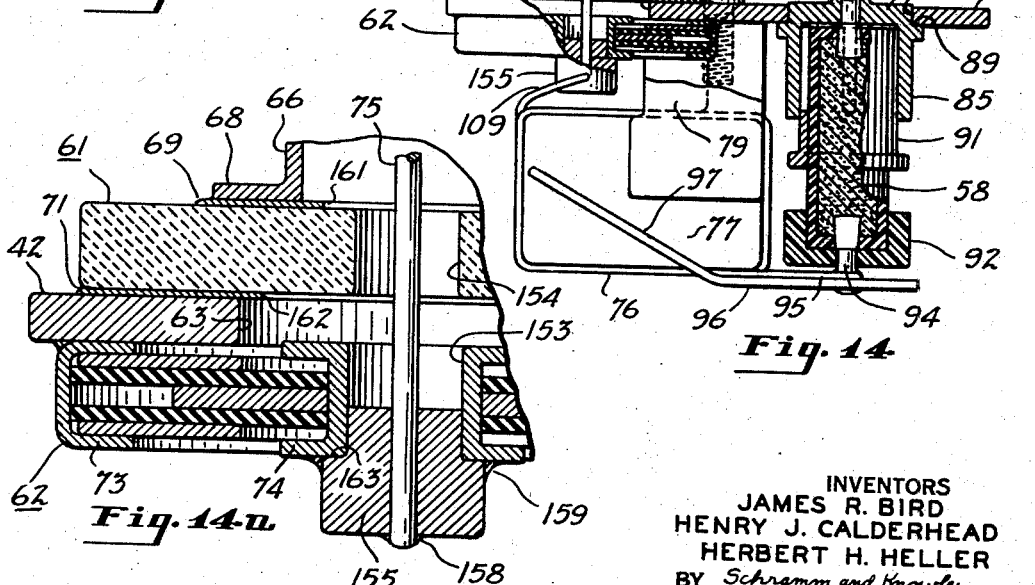
INVENTORS
JAMES R. BIRD
HENRY J. CALDERHEAD
HERBERT H. HELLER
BY Schramm and Knowles
ATTORNEYS

United States Patent Office 2,891,221
Patented June 16, 1959

2,891,221

STANDING WAVE INDICATOR

James R. Bird, Chagrin Falls, Henry J. Calderhead, Euclid, and Herbert H. Heller, Cleveland Heights, Ohio, assignors to Bird Electronic Corporation, Cleveland, Ohio, a corporation of Ohio Application February 24, 1955, Serial No. 490,334

17 Claims. (Cl. 324—95)

This invention relates to electrical systems for indicating or measuring high frequency wave signals or wave energy, mainly the measurement or detection of such wave signals or energy propagated along a tubular transmission line, especially a coaxial transmission line, and to the mode of operation, to the construction, and to the combination and connection of parts or components in such systems.

It is frequently desirable to detect or measure high frequency electrical wave signals or signal energy on a transmission line of the tubular type, a coaxial transmission line comprising an elongated inner conductor within, co-axial to and electrically insulated from an elongated tubular outer conductor being a specialized form of tubular transmission line. Measurements commonly made on such transmission lines include those of the standing wave ratio, the reflection coefficient, and the energy propagated.

Various instruments have been employed for obtaining measurements of the standing wave ratio on transmission lines of the character mentioned, one type of instrument employing a probe movable to different positions along the transmission line as in an elongated slot. The probe is connected through a suitable network to an indicator by means of which the size or magnitude of the wave at different points along the line is determined. From such information the standing wave ratio is readily calculated.

Other instruments employ directionally sensitive components, one component being arranged to indicate or respond to electrical wave signals traveling in one, or the forward, direction along the transmission line and another such component being arranged to respond only to electrical wave signals traveling in the other, or the reverse, direction along the line. From information so obtained, the reflection coefficient and standing wave ratio are obtained conventionally. These directional instruments employ various pickup arrangements such as probes and loops, the probes providing capacitive coupling and the loops providing inductive coupling to a transmission line. Another arrangement utilizes a resistive bridge on or across the transmission line, as disclosed in copending application for patent Serial Number 224,762.

It has been proposed to obtain separate measurements or indications of the forward and backward traveling wave signals on a transmission line by directional couplers in which a loop is subjected to the electrical field within the transmission line to provide inductive coupling, the loop being reversible in the field as by an arrangement for rotating the loop through 180°. The same loop and its associated network respond to either the forward or backward traveling wave signal, depending upon the way in which the loop is oriented. Such directional couplers of the rotatable or reversible type present special problems in mechanical design because of the relative movement of parts and the need for short connections between components in order to minimize capacitances and inductances which interfere with theoretical functioning of the detecting network or circuit. One form of construction devised to permit relative movement while providing short secure connections between components is illustrated by the directional wattmeter disclosed in the copending application of J. R. Bird and H. J. Calderhead, Serial No. 344,542 filed March 25, 1953.

It is known that a loop located in the electrical field between the inner and outer conductors of a coaxial line has a voltage induced therein proportional to current I in the inner conductor, there being mutual inductance M between the loop and the transmission line, the loop being positioned in the plane of the inner conductor of the line.

It is also known that a series circuit of resistance R positioned in the plane of the inner conductor of the line, conductors will give a voltage across the resistance R proportional to voltage E between the line conductors. In directional couplers and so-called reflectometers the arrangements mentioned are combined in a sampling circuit in which the resistor R is connected in series with the loop and capacitive coupling is provided as by capacitor plates or armatures on the loop and the inner conductor or by capacitance effects between the components of the sampling circuit and the inner conductor. Dimensions are kept to a minimum, much less than the wave length of the energy transmitted, and in considering the theory of operation it is satisfactory to refer to lumped impedances rather than evaluating the distributed parameters. In practice, however, it has been necessary to supplement theoretical calculations with empirical methods of testing in making corrections for distributed capacitance and distributed inductance. It is in this connection that the present invention has been particularly effective in that the structural arrangements or geometry of the instrumen shown permit very short connecions between parts and special provision has also been made for effecting adjustments in theoretical design as dictated by results of tests and similar empirical evaluations.

Considering the sampling circuit mentioned and using lumped impedances, it is apparent that the mutual inductance M is either positive or negative, depending upon the directional relation between the loop and the wave signal energy traveling on the line. As in earlier devices, the instrument of the present invention obtains reversal of the mutual inductance M through 180° rotation of the loop relative to the transmission line. The components are so selected that:

$$RC = \frac{M}{Z_0} = K$$

$Z_0$ being the characteristic impedance of the line and K being a constant.

As will be understood by those skilled in the art and discussed more fully in said copending application SN 344,542, directional couplers or reflectometers used in directional wattmeters give the absolute power at a known frequency. The readings may be obtained by the use of a thermocouple together with a milliammeter responding to current in the loop or sampling circuit. It has also been proposed to utilize diode contact rectifiers and the present invention relates particularly to improved positioning arrangements and structure as well as arrangements of electrical connections in a device using a diode type of rectifier, in which improved mechanical sturdiness, durability, electrical accuracy, precision and reliability are obtained.

The structure of the standing wave indicator disclosed herein provides for supplementing the sampling circuit of the loop and resistor of known instruments by a capacitor used in association with the diode contact rectifier and series connected in the resistor-loop circuit. This supplemental capacitor is connected in parallel relation to the diode circuit which includes the galvanometer or other indicator external to the high frequency components and is of much greater pacacitance than the capacitance C coupling the loop and other components of the sampling circuit to the transmission line. The effect of such capacitor is to give broad frequency band operation.

It is believed that, since the generated voltage in the loop resistor circuit is proportional to frequency and the impedance of the supplemental capacitor is inversely proportional to frequency, the output voltage across the capacitor can be made to remain constant, or substantially so, by suitable selection of values and provided the total impedance of the circuit remains constant. Thus, the supplemental capacitor counteracts or offsets the inherent voltage rise of the reactive generator comprising the capacitive and inductive pickup system of the loop and makes the sampling circuit substantially insensitive to frequency over the designed range. It has been found practical utilizing this feature of a supplemental capacitor to construct instruments having effective frequency ranges of 2½ to 1, and even higher ratios are feasible, such as 5 to 1. In practice, for example, an instrument made as hereinafter described is effective over a frequency range of, say, 25 to 60 megacycles, or 400 to 1000 megacycles, depending upon the components selected in the makeup of the instrument to satisfy the equation previously given.

Another characterizing feature of the present invention is concerned with the resistor R and its performance over a wide frequency band. To compensate for objectionable frequency effects and obtain more uniform characteristics at different frequencies this resistor is associated with a capacitance in shunt relation. In its preferred form the invention employs a commercial resistor of elongated cylindrical shape having an insulating body. Received about the body is a conductive element connected to one of the resistor terminals. This conductive element desirably takes the form of a tubular sleeve of brass or similar metal and at one end is received within a cylindrical socket of a conductive mounting base or body which also receives one end of the resistor. Variation in the capacitance between the conductive sleeve and the resistor is obtained by axially sliding or moving one relative to the other, this constituting a simple adjustment for use in original assembly to adapt different resistors to the circuit. The capacitor sleeve is open at one end and with the resistor enclosed constitutes an open stub coaxial capacitor.

In the system or device of the present invention, and as one of its principal objects, a directional coupler of the rotatable or reversible type is assembled in a compact arrangement of closely connected components to provide a rugged, reliable unit that can be easily manufactured in quantity at comparatively low cost.

Another object is to provide an indicator arrangement for a high frequency electrical system for detecting wave signals on a transmission line, the system being of the type in which a pickup unit is carried rotatably on a support mounted on the tubular conductor of the transmission line and projects into an opening in the conductor. Furthermore, it is an object to provide an arrangement including an indicator external to the line and connected to the rotatable unit through the support in such a way that removing and replacing the pick-up unit from and on the support automatically disconnects and reconnects the indicator. More specifically, it is sought to provide for automatic connection of the pickup unit circuit to the indicator only in different predetermined positions of the pickup unit relative to the transmission line to insure correct orientation of the parts. In a further refinement of this aspect of the invention, the support is formed with a socket into which the pickup unit, complementally shaped, is received in interfitting relation, suitable means being provided for locating the pickup unit axially relative to the support socket, for retaining the unit in the socket, and for maintaining yielding pressure of the unit against the support in the region of the opening into the transmission line.

Still another object is to provide a concentric line insertion device with interchangeable connector fittings such that the device may be inserted in concentric lines of different diameters or with different types of connection fittings without disturbing or changing the internal arrangement or construction of the insertion device.

Another object is to provide an improved pickup unit for use in a high frequency electrical system of the character described, the pickup unit contemplated being a structure comprising a greatly simplified assembly of few relatively thin flat conducting and insulating elements stacked in alternating relation flatwise against one another and held within a cavity in a body of conductive metal. In the preferred arrangement shown, the body and a cap shieldingly enclose the stacked elements and the structure constitutes a plug adapted for facile removal from and replacement in a socket of a suitable mount attached to the outer tubular conductor of the transmission line, or integral therewith. The pickup unit of the preferred arrangement may also include a rectifier contained in a recess formed by aligned openings in the stacked elements.

As a still further refinement of the pickup unit structure, one of the stacked conducting elements thereof constitutes a sub-assembly mount, or disc, in that it is formed locatingly to receive circuit components including button type capacitors, the latter being receivable on opposite sides of the mounting disc and in predetermined aligned relation. As an adjunct of the removable pickup unit feature, useful in combination with the stacked element arrangement but not restricted thereto, the mounting disc is formed with a recess to receive and locate one of the circuit components as by receiving one end of the resistor of the loop-resistor combination so as to predetermine the position of the loop relative to the body of the pickup.

Also associated with the pickup structure and illustrated in connection with the mounting disc subassembly feature is a novel arrangement of button capacitors and a metal-shelled diode crystal rectifier which provides extremely short connections between the parts. In this arrangement the button capacitors and the rectifier are aligned on a common axis so that the conductive cylindrical shell of the rectifier may be used as one terminal thereof and connected to an armature or plate terminal of one of the capacitors and the other terminal of the rectifier is extended through the center openings of one of the button capacitors and connected to a terminal plate of another capacitor.

Other objects and advantages pertaining to certain novel features of construction and combinations and arrangements of parts are apparent in the following detailed description of a preferred embodiment of the invention, this description being made in connection with the accompanying drawings forming a part of the specification.

In the drawings:

Fig. 1 is an elevational view, partially diagrammatic, partially in section and with parts broken away, of a high frequency electrical system incorporating a directional coupler embodying the principles of the present invention and constituting an insertion type wattmeter or standing wave ratio indicator for use in a coaxial transmission line;

Fig. 2 is an end view of the apparatus of Fig. 1 drawn to a somewhat enlarged scale, partially broken away, and partly in section, represented as seen by looking in the direction of the arrows 2—2 shown in Fig. 1;

Fig. 3 is a fragmentary plan view of the apparatus of Fig. 1 drawn to the same scale as Fig. 2, partly broken away and partly in section, to expose the interior represented in section as cut by a broken plane 3—3, indicated in Fig. 2;

Fig. 4 is an elevation of the removable detector cartridge or pickup unit drawn to the scale of Fig. 1, showing it removed from the support on the transmission line;

Fig. 5 is an enlarged cross-sectional view of the cartridge represented as cut by a plane 5—5 indicated in Fig. 4;

Fig. 6 is a view of a vertical section of the cartridge of Fig. 4 represented as cut by a plane 6—6 indicated in Fig. 5;

Fig. 7 is a view of a vertical section of the central body of the cartridge represented as cut by a plane 7—7, also indicated in Fig. 5, perpendicular to the section plane of Fig. 6;

Fig. 8 is a fragmentary view of a vertical section of the cartridge represented as cut by a plane 8—8, indicated in Fig. 5;

Fig. 9 is a view represented as seen by looking up at a section of the cartridge cut by a plane 9—9 indicated in Fig. 6, but drawn to a smaller scale than Fig. 6;

Fig. 10 is a corresponding view from a plane 10—10 of Fig. 6, the insulating cap being here removed;

Fig. 11 is an exploded view of the cartridge of Figs. 4 to 10, representing many of the parts in section as cut by the vertical plane 6—6 of Fig. 5, so that the view corresponds to Fig. 6 drawn to reduced scale, but with certain parts revolved from their true positions into the section plane;

Fig. 12 is a diagrammatic representation of the system of the present invention, showing the electrical relationship of the several parts and components in schematic form;

Fig. 13 is a plan view of one of the stacked insulators;

Fig. 14 is view in vertical section of a subassembly supported by a mounting disc and constituting part of the apparatus illustrated in Fig. 6; and Fig. 14(a) is an enlarged fragmentary view in section of a part of the subassembly of Fig. 14.

Like reference characters are utilized throughout the drawings to designate like parts.

The directional coupler shown in the drawings as an illustrative embodiment of the invention is part of a wattmeter intended for use as an insertion device to measure forward traveling and reflected wave signal energy on a coaxial transmission line. Included in the system or device are a number of subcombinations or subassemblies and structural features that are useful in other applications concerned with high frequency electrical energy. The pickup or coupler structure can, if desired, be mounted directly on a tubular transmission line formed with a suitable aperture to receive the sensing element or probe. It is preferable, however, to produce the system as an insertion device which can be incorporated in a high frequency electrical transmission line by means of conventional connectors or fittings.

As here shown the device or system includes a short section of transmission line L comprising a metal outer conductor 1 in the form of a cast metal tube of brass or the like and a coaxial inner conductor 10. The tube has a smooth internal cylindrical surface 2 in the ends of which insulator bushings composed of polytetrafluoroethylene (Teflon) 3 are shrink fitted. The bushings, 3, are provided with internal bores 4 of a suitable size to receive reduced diameter end portions 5 of the center conductor 10, which is thereby centered axially in the tubular outer conductor 1. The internal cylindrical surface 2 of the outer conductor 1 and the rod-like inner conductor 10 comprise a coaxial line section having a characteristic impedance corresponding to that of the coaxial transmission line in which the device or system is inserted. As here shown, the characteristic impedance is approximately 50 ohms, the proportioning of the parts being conventional to obtain the desired impedance and to avoid objectionable reflections.

On the ends of the outer conductor 1 are mounted connector fitting assemblies for attaching the device to or between the ends of conventional coaxial lines. Each of the end fitting assemblies comprises a tubular metal element 6 conveniently made in the form of a turning of brass or the like. Each of the tubular fitting elements is formed at one end with a circular external rabbet so as to be received within the center circular opening of an attaching element or flange plate 7 also of brass or the like. The tube 6 is brazed or silver-soldered into the opening in the attaching plate and, of course, is rigid therewith. If desired, the tube and attaching plate may be formed in one piece as an integral unit. In outline form this attaching plate 7 corresponds to the respective ends of the conductor body 1, being here substantially square as shown in Fig. 2. Cap screws 9 are received through openings in the corners of the attaching plates 7 and are threaded into the conductor body 1, to thereby draw the end connector fitting plate 7 snugly against the flat end face of the body 1 to establish a strong physical and a good electrical connection around the entire circumferential extent of the internal circular conductor surface 2.

An external thread 11 on the outer end of each of the connector fitting elements 6 is adapted to receive the conventional coupling collar (not shown) carried on the end of the coaxial transmission line to which the unit "L" is to be connected or in which it is to be inserted.

For connection of the ends of the center conductor 10 to the center conductor or conductors of the transmission line or lines in which the device is inserted, the following arrangement is employed as part of the connector fitting assembly feature:

The conductor 10 is formed with axial bores 14 in its ends to receive tapering inner ends 13 of terminal rods or pins 12. Each of these pins is held in a tubular bushing or insulating sleeve 18 of stiff plastic material such as polytetrafluoroethylene received as by a press fit in a cylindrical bore in one of the end fitting elements 6. Good electrical connections are accomplished by slitting the inner ends 13 of the connector pins 12 so that the pin ends have spring fits in the end bores 14. The outer ends 15 of the connector pins are also slotted and formed with axial bores to receive and yieldingly spring grip the terminal pins of the conventional coaxial line end fittings as the latter are pressed into tapered outer end openings 16 of the connector elements 6.

The cylindrical opening that receives the tubular insulator 18 at the inner end of the connector element 6 is formed by a counterbore which provides a circular radial shoulder 16 in the middle of the tubular element, this shoulder constituting a seat for locating the plastic insulator tube 18 in assembly. These insulator tubes 18 that support the connector pins 12 are of greater axial length than the cylindrical counterbores in which they are received, the portion of each insulator that projects beyond the plane of the base flange 7 being of reduced diameter, as indicated at 19, being received within the bore 4 of insulator bushing 3 and being abutted against the end of the reduced diameter portion 5 of the inner conductor 10. The formation of the reduced diameter end portion 19 on the insulator 18 provides also a radial shoulder 17 in the plane of the end face of the connector fitting assembly, the shoulder 17 abutting the end face of the insulator bushing 3 about the end face opening into the latter. The ends of the reduced diameter portions 5 of the center conductor 10 are spaced axially from the planes of the adjacent circular end openings into the outer conductor 1, such axial offsets improving the transition, since the step down to the diameter of the pin 12 at each end is thus axially spaced from the plane of the step down in the outer conductors. Likewise, the transitions from the annular plastic bushings 3 to the air dielectric in the space surrounding the center conductor 10 are improved by short axial extensions 22 on the plastic insulator bushings 3, the extensions each being of the same outer diameter as the center conductor 10 and being abutted endwise against the shoulder formed on the center conductor by the reduced diameter end portion 5.

By reason of a strong frictional grip on the outer periphery of the insulator bushing 3 by the cylindrical surface 2 of the outer conductor, it is feasible to remove and replace either one or both of the connector end fitting assemblies without disturbing relationship between the center conductor 10 and the outer conductor 1 of the coaxial line. Removal of one of the fitting assemblies is accomplished by withdrawing the holding screws 9, permitting the attaching plate 7, the tubular element 6, the connector pin 12 and the insulator 18 to be removed as a unit.

Thus, the end fitting assemblies (or one of them) are readily removable for replacement by a different type of fitting assembly or a fitting assembly of a different diameter or configuration.

The fittings can be readily supplied in different sizes and kinds of plug or socket connectors for use in adapting the insertion sampling device to coaxial transmission lines having different kinds and types of end fittings and of different sizes, the substitution being facilitated by the interfitting spring pin-socket arrangement of the center conductor pin 12 carried by the insulator bushing 18 of the outer tubular element 6. In the removal and replacement of the end fitting assemblies, or one of them, no rotation or turning of one combined part relative to the other is necessary, since the parts are readily brought together or separated by simple rectilinear movements. Such removal of the end fitting does not interfere with the adjustment or setting of any of the other parts or components of the instrument assembly, since the rigid insulator bushing 3 holds the center conductor 10 in fixed relationship to the outer conductor 1 during the removal and replacement of an end fitting assembly.

A cartridge-supporting structure S is formed integral with the tubular outer conductor 1 intermediate the ends of the latter comprising a body block portion 20. A cylindrical socket 21 is formed in the body block 20 and normal to the line axis to receive a plug-like pick-up unit or cartridge U. The pickup unit U is in the form of a cartridge adapted for facile removal and replacement and is rotatably mounted in the supporting socket 21. The socket intersects the cylindrical inner surface 2 of the outer conductor member 1 so as to provide an access aperture 23 through which a sensing element of the cartridge U is inserted into or subjected to the electrical field of the transmission line L.

The pickup unit U comprises an assembly of parts and components connected electrically to form a part of a detector circuit. For convenience and simplicity, the pickup unit is designed so that it can be built up in stages, thus facilitating manufacture. By providing a structure which is adaptable to use as subassemblies in manufacture, it is feasible to have the device assembled by relatively unskilled individuals who need not understand the theoretical considerations governing the design of high frequency equipment. By reason of the limited number of operations each performs, the assemblers become adept and efficient in their particular tasks, thus obtaining accuracy and a high rate of production. The subassembly technique in manufacture also has inspection advantages which facilitate production control to maintain high standards of quality and precision.

The unit U comprises a hollow cylindrical body member 31 with a mating cap member 32 connected by suitable means such as a single centrally located axial machine screw 33, and enclosing detector circuit components, including thin, flat, conducting and insulating elements interleaved in alternating relation. The cylindrical body 31 and cap portion 32 are machined from brass or similar material. The cylindrical outer surface 24 of the body 31 of the unit U including a skirt 25 has a sliding fit in the support socket 21. Circular end 26 of the body seats against a circular shoulder 36 (shown by hidden lines in Fig. 2) at the inner end of the socket 21 in the support block portion 20, the locating shoulder 36 surrounding the opening 23 into the line L. Within the skirt 25 and at the lower end of the body is a cylindrical chamber 27 above and continuous with, which is an elongated transverse chamber 28. There is an annular cavity 29 in the upper end of the body 31. The upper cavity surrounds a center post drilled and tapped to receive the cap attaching screw 33. The chambers 27 and 28 may be regarded as two parts of a lower cavity in the body 31.

The body 31 and the cap member 32 are interfitted, one of the members, preferably the body 31, having a shouldered groove 37 adapted to receive a circular flange 38 of the other or cap member 32. It will be apparent that the axis of the body 31 of the unit U is substantially normal to the longitudinal axis of the coaxial line section L. The cartridge U has a sliding fit in the support socket 21, guiding and holding the pickup unit U in predetermined relation to the coaxial line section L and providing a good electrical contact between the rotating cartridge U and the supporting structure S of the coaxial line outer conductor member 1.

Stacked in the body 31 are the thin, flat conducting and insulating elements previously referred to and shown separately in Fig. 11. These include a flat insulator strip 39, a connector strip 41 and an insulator strip 43 in the chamber 28 in the body 31, and a mounting plate or disc 42 in the lower chamber 27 within the skirt 25. The members 39, 41 and 43 have substantially the shape of an ellipse or oval with flattened sides to fit the chamber 28 and the mounting disc 42 is circular to fit in the chamber 27 against the circular shoulder at the margin between or juncture of the two chambers 27 and 28. The members 41 and 42 are composed of suitable metal which is a good electrical conductor, such as brass. The strips 39 and 43 are composed of suitable insulating material such as plastic.

The stacked conductive elements 41 and 42 and the plastic insulators 39 and 43 associated therewith are formed with aligned apertures to receive assembling machine screws 34 and 35 and other elements which will later be described. A central axial machine screw 44 is provided to secure the insulator 43 with elements 39 and 41 in the transverse cavity 28 in the body 31 and mates a threaded reduced diameter lower portion 45 of the same axial passage that has a larger diameter threaded upper portion 46 receiving the knob holding screw 33. Flat head screws 47 and 48 are provided which are adapted to be threaded in eccentric tapped holes 179 and 180 (Fig. 10) in a transverse wall or web portion 49 of the body 31 in order to secure the mounting disc 42 against suitable locating means in the body, such as an annular shoulder 50 surrounding the chamber portion 28.

A stand off insulator 51 is provided which has a glass button portion 52 in a flanged metal sleeve 171 adapted to fit in an opening 172 (Figs. 5 and 8) in the body wall 49 and a stem portion 54 in the form of a conducting metal pin serving as a connection post for one terminal lead 55 of a rectifier load resistor 56 as well as a flexible lead 101 connected to a rectifier 64 to be described later. There is a sampling resistor 58 with a lead 57 connected to the disc 42. A diode charge condenser 61 and a band-broadening shunt condenser 62 of the flat annular type are provided, which are adapted to be mounted against the upper and lower surfaces respectively of the conductive mounting disc 42 coaxial with an eccentrically located opening 63 therein.

A rectifier or diode 64 of the germanium crystal type, preferably having a conductive metal outer shell body or cylinder 65 is provided, the body 65 being connected electrically to semiconductor pellet 135 of germanium or the like as by metal mounting plug 137 for the latter. The bare metal shell 65 thus serves as one terminal of the diode 64, the customary terminal rod 102 being snipped off and not used. For electrically connecting the terminal shell 65 of the diode 64 to the upper surface of the condenser 61, and supporting the diode 64, a longitudinally slotted spring metal sleeve member 66 is provided, having spring fingers 67 adapted to grip the bare metal terminal shell 65 of the diode 64 and having an outwardly directed radial flange 68 adapted to make electrical contact with the upper plate 69 of the condenser 61 to which it is soldered.

The latter condenser has a lower plate 71 soldered to and making electrical contact with the mounting disc 42. The condenser 62 may likewise have upper and lower plates, one lying against and soldered to the mounting disc 42 and thereby making electrical contact therewith.

The condenser 61 is of a type well known to those skilled in the art, in which the condenser plates are formed or deposited in the form of annular leaves of silver or other conductor on the surfaces of an annular dielectric of ceramic material or the like, the dielectric having central apertures and the plates having central apertures of relatively large diameter so that an electrical connecting conductor may be passed through the central apertures without making electrical contact with the condenser plates. The condenser 62 may be of the same type, but for detectors of a lower frequency range, as illustrated, is preferably of the interleaved annular mica and silver plate type having a peripheral terminal 73 and a central annular terminal 74.

Accordingly, when the diode 64 is in assembled position within its supporting sleeve 66 and coaxial to the condensers 61 and 62 on the conductor disc 42, the pin terminal 75 of the diode 65 passes through both condensers 61 and 62 without making electrical connection with the condenser 61 and being connected only to the terminal 74 of the condenser 62.

For supporting an inductive pickup coil 76 within the electro-magnetic field of the line L between the outer conductor 1 and the inner conductor 10, a winding form 77 is provided composed of a block of dielectric material such as a polystyrene plastic. The block 77 comprises rectangular body portion 78 on which the coil 76 is wound, integral with two spaced parallel legs 79, each leg having a threaded opening 81 to receive a screw 82 by means of which the form 77 is secured to the disc 42, the screws 82 passing through eccentric openings not shown in exploded view of Fig. 11 owing to the fact that they lie in a plane perpendicular to the section plane of Fig. 11.

For mounting the sampling circuit resistor 58 centrally with respect to an opening 84 in the mounting disc 42 a metallic cup 85 is provided having a sleeve portion 86 adapted to fit around the upper end of the resistor 58 which is of standard construction with a cylindrical enclosing body of insulating material. The cup 85 is provided at its closed end with a neck 87 having a coaxial bore 88 to receive the upper terminal lead 57 of the resistor 58. Adjacent its base the cup has a shoulder 89 adapted to seat against the lower surface of the disc 42 for locating the cup 85 centrally as well as axially with respect to the opening 84 in the disc 42.

For adjustment in distributed capacitance provided to give "flat" response characteristics over a wide frequency band to the detector unit or cartridge and other beneficial results a slidable sleeve 91 is provided of brass or similar metal. The upper end of the adjusting sleeve has longitudinal slots and is of such outside diameter as to provide a spring fit within the sleeve portion 86 of the cup 85. The distributed capacitance may be adjusted by axial movement of the sleeve 91 within the cup 85.

A cap 92 composed of suitable insulating material such as ceramic is provided for the lower end of the resistor 58 with an opening 93 therein to receive lower lead 94 of the resistor 58 which is soldered to one end 95 of the coil or inductive loop 76, wrapped about the body 78 of the form 77. A wing-shaped member 96 including a pair of spaced parallel balancing tabs 97 is also soldered to the junction 94—95 for adjusting the capacitance coupling with the central conductor 10, these tabs being bendable as to the positions shown in Fig. 14 in which they straddle the form body 78.

For insulating the bare metal terminal shell 65 of the rectifier 64 from the body wall 49 through which it projects, a sleeve 98 of suitable material such as ceramic is provided. A flexible thin metallic connection ribbon or shim stock strip 101 (Fig. 14) is soldered at one end to the upper part of the socket sleeve 66 which thus serves as one contact for the diode rectifier 64, as well as a mount or holder. The other end of the lead ribbon 101 is soldered to the stand-off insulator post 54. Likewise, the lead 55 of the resistor 56 is soldered to the post 54, whereby both the detector 54 and the resistor 56 are supported independently and the connections of neither one will be affected by inertia forces acting on the other in case the cartridge or the standing wave unit in which it is mounted should be subjected to large accelerating or decelerating forces such as encountered in aircraft installations or on vehicles moving on rough roads. Furthermore, replacement of one component without disturbing the other is feasible.

The connection strip 41 is cut out centrally as shown in Fig. 9 and the cut-out piece or a portion thereof is bent upwardly at a right angle in the provision of an integral tab 104, to which a second lead 105 of the resistor 56 is soldered.

Thus, the resistor 56 is electrically connected between the connector strip 41 and the stand-off insulator post 54 and also supported thereby.

The connection strip 41 has a pair of opposite contact ears 106 and 107 projecting in diametrical relation through slots 108 cut 180 degrees apart into the cylindrical walls of the body 31 for making connections from the cartridge U to a galvanometer G. The slots 108 are large enough to provide insulating clearance around the projecting contact ears.

The other end 109 of the pickup loop or coil 76 is connected to one terminal of the band broadening condenser 62 and to the lead 75 of the crystal detector 64, preferably by soldering. In the illustrative drawings a relatively low frequency form of detector cartridge is shown in which the inductive loop 76 has a plurality of turns and the condenser 62 is in the form of a button condenser having a peripheral terminal 73 soldered to the conductor disc 42 and a central eyelet terminal 74 through which the detector lead 75 extends. The terminal 74 is soldered to the lead 75 of the diode rectifier and to the end 109 of the inductive pickup coil 76. Nevertheless, it will be understood that the invention is not limited thereto and that if desired a single turn form of inductive loop such as shown in Figs. 10 and 12, for example, of the copending application, Serial No. 344,542 may also be employed for cartridges designed for higher frequency ranges. A parallel plate type of condenser similar to the condenser 61 may then be employed instead of the condenser 62. If such a condenser is employed, its upper plate is soldered to the conductor disc 42 and its lower plate is soldered to the detector lead 75 and the end of the inductor loop 76.

For protecting the inductive loop 76, the balancing tabs 97 and the resistor 58, particularly when the cartridge unit U is removed for replacement by a different cartridge having a different frequency range, a cover 111 of insulating plastic such as polytetrafluoroethylene is preferably provided, in the form of a cup having a cavity of sufficient size to receive the loop 76 and the resistor 58 with the balancing tabs 97 and having base flanges 112 with threaded holes 113 adapted to receive the fastening screws 34 and 35 (Figs. 5 and 9–11).

It will be understood that in the exploded view Fig. 11, the screws 34 and 35 and the tapped holes 113 have been shown as if revolved about the axis of the unit approximately 45 degrees from their actual positions in order to bring them into the section plane of Fig. 11 and to illustrate them in that figure. Likewise the screws 47 and 48 for securing the conductor disc 42 have been shown as if revolved approximately 45 degrees from their actual positions in order to show them in the section plane of Fig. 11. The actual position of the flat head screw 47 is shown in the sectional view Fig. 8 representing a section cut by the plane 8—8 of Fig. 5 in which plane the stand-off insulator 51 also lies.

The knob 32 is provided with a knurled rim 114 to facilitate rotating the entire cartridge U through an angle of 180 degrees in order that the loop 76 may be presented to the electromagnetic field in the coaxial line L in either forward or reverse position for detecting either forward or reflected energy as will be understood by those skilled in the art. As illustrated in Fig. 1 and in order to fix the limits of rotation of the knob 32, a radially projecting pin 115 is brazed in a slot provided in the edge of the cap flange 38, the pin projecting through a notch 191 (Fig. 5) in the upper edge of the circular wall of the body 31 and being adapted to cooperate with stop shoulders 116 formed 180 degrees apart in the block portion 20.

A lateral opening 117 is provided in the block portion 20 as shown in Fig. 3 for cooperating with a flanged base threaded fitting 118 bolted to the block portion 20 by screws 119 for receiving a conventional coaxial line fitting 145 carrying a shielded cable 142 including center 143 and outer sheath 144, conductors for connecting the cartridge U to the galvanometer G.

Within the fitting 118 there is an externally threaded plug 121 for securing a button-type bypass condenser 122 against a shoulder 123 provided in the fitting 118, as by an inwardly directed circular flange surrounding the end opening of the fitting. The button condenser 122 is of the conventional type similar to the capacitor 62 described previously and having annular interleaved condenser plates with a peripheral terminal 120 and a central terminal as will be understood by those skilled in the art. The peripheral terminal 120 is grounded as shown in Fig. 3 to the metallic structure 20 by direct contact with the shoulder 123. For making connections to the central terminal of the button condenser 122 and to the internal conductor 143 of the shielded line 142 as well as to the cartridge U, a central contact pin 124 is provided, having an external connection knob 125 and a stem portion 126. An annular insulator 127 is secured between a flanged base on the knob 125 and the condenser 122. A central circular sectioned contact or conductor plug 128 is insulated from the plug 121 by deformable insulator bushing 129. This plug, of brass or similar metal, avoids contact with the peripheral terminal of the condenser 122 but makes contact with the central terminal of the condenser 122 through the stem 126 and has a spring finger contactor 131 connected thereto.

For securing the plug 128, the insulator bushing 129 and the plug 128 are provided with shoulders at a common surface 130, and the threaded plug 121 and the insulator bushing 129 are likewise provided with circular shoulders at a common surface 133. The inner end 134 of the stem is staked or soft-soldered in the inner end of plug 128, and the spring finger member 131 is secured and electrically connected to the plug 128 as by means of an integral circular ring on the end of the spring finger received and secured about a reduced diameter end of the contact plug 128.

At the end of the metal spring finger 131 there is a contact button 132 adapted to make connection with one or the other of the ears 106 or 107 of the connection strip 41 in the cartridge U depending upon the angular position to which the cartridge U has been rotated by the knurled knob 114. In this manner the connection from the detector loading resistor 56 to the galvanometer G is completed through its lead 105, tab 104, the connection strip 41 with its ear 106 or 107, the contact 132, the spring finger 131, the plug 128, the stem 126 and the connection knob 125 to the galvanometer center lead 143.

A flat latch member 148 is held fast on the upper end of a shouldered pin 147 that extends through hole 185 in the latch. The latch is thus mounted for rotative movement into and out of the full line position shown in Fig. 3, in which position the latch overlies the upper end of the cartridge unit body 31 and the flange 38 of the knob 32. The pin 147, guided in the body block 20, extends through a recess 189 opening through the side of the block, the pin being guided for free turning movement in aligned bores formed in the portions of the body block above and below the recess. A helical coil compression spring 146 is received under compression about that portion of the pin 147 that extends across the recess 189, the spring reacting against seat 188, formed by the body block portion at the top of the recess, and against a collar 187 secured on the pin 147 against axial movement. Thus the spring normally biases the pin 147 so as to draw the latch 148 downwardly against the cartridge unit U and thereby hold the latter against the bottom shoulder 36 in the socket recess 21 in the desired predetermined relation to the conductors 2 and 10 of the coaxial line section. When so held the unit U can be manually rotated back and forth between the two positions provided by the locating action of the pin 115 against the shoulders 116.

A shouldered head stop pin 150 is pegged into and held frictionally in place in a hole in the top of the body block 20. This pin is so located that its head engages the latch 148 at the base of an integral upturned flange 149 of the latch to hold the latter in the cartridge retaining position of Fig. 3. To release the latch for removal and replacement of the cartridge unit, the pivot pin latch assembly 147, 148 is raised slightly, as by lifting on the latch flange 149, so that the latch clears the side of the stop pin 150 and can be shifted onto the top semicircular flat surface 152 which comprises half the top of the pin. The other half of the pin top is spherically curved and provides an upstanding shoulder against which the latch flange 149 is abutted when the latch is fully retracted as to the broken line position of Fig. 3.

When the latch is advanced onto the ledge of the cartridge, the slight projection of the upper end of the cartridge body 31 above the top surface of the body block 20 (see Figs. 1 and 2) holds the latch 148 raised against the force of the spring 146 off the seat which it would otherwise occupy. Thereby the latch maintains a frictional grip on the cartridge unit by reason of the biasing force of the spring 146. In this manner turning of the cartridge unit in the socket 21 is frictionally restrained—at its lower end by engagement of the bottom edge of the cartridge 26 against the shoulder 36 and at its upper end by engagement of the latch 148 against the upper end of the cartridge body.

The crystal rectifier or diode 64 is connected between the remote plates or terminals 69 and 74 of the condensers 61 and 62, respectively. The rectifier used may be any one of several well-known constructions, although the particular mounting and connecting arrangement employed and utilizing a diode having a conductive shell or casing is one of the advantageous features of the present invention. Suitable diodes or rectifiers are available commercially and, briefly described, comprise a pellet or crystal 135 of germanium or other semiconductor which is contacted by a whisker wire 136 of platinum, ruthenium or the like. The crystal and the whisker wire contactor are respectively mounted on the confronting ends of axially aligned rods 102 and 75 which constitute terminals for the rectifier. A protective sheath, here a conductive metal tube 65, surrounds the crystal, whisker wire and the terminal rods. Suitable annular supporting elements such as metal plug 137 and an insulator 138 of glass or plastic material embrace the terminal rods, to locate the latter in alignment in coaxial relation to the tubular sheath 65. These annular supporting elements 137 and 138 seal the openings in the ends of the sheath 65 and are spaced from one another in the provision of a central chamber in which the crystal and whisker wire are situated. The whisker wire is, of course, adjusted to a sensitive spot of the crystal or semiconductive pellet at the time of manufacture of the rectifier and the grip of each supporting element on the corresponding terminal rod retains the parts in adjusted relation. To use a diode having the terminal rod 102 and the semiconductor pellet 135 supported in the sheath by an insulator instead of by the metal plug 137 the terminal 102 may be connected to the shell 65 electrically as by filling in space 139 with solder or the like.

The rectifier 64 is disposed in coaxial alignment with the central openings in the condensers 61 and 62. One of the rectifier terminals—terminal 75— extends axially through the aligned capacitor openings and through the coaxial opening 63 in the mounting disc 42.

The advantages of the structural features of the present device, particularly from the point of view of assembly and repair will become apparent from consideration of the figures. Moreover, it will be observed that the particular construction and arrangement of parts lends itself to rapid mass production by progressive building up of subassemblies. One of the subassemblies comprises the conductive mounting disc 42 and the several parts carried thereby, as illustrated in Fig. 14. In building this subassembly the cup shaped insulator support 85 is located, secured and soldered in the socket 84 of the disc. The capacitors 61 and 62 are disposed against and secured by solder to opposite sides of the disc in axial alignment with one another and with the disc opening 63. At the time the capacitors are soldered to the disc, the flanged sleeve 66 for holding the diode 64 may be soldered to the armature 69 of the capacitor 61.

It will be understood that the upper and lower plates or silver leaves 69 and 71 of the ceramic disc insulator 61 are already silvered or tinned so that they will be joined readily by soldering to other parts. When the diode supporting sleeve 66 is fabricated, the lower surfaces of the flange 68 are also tinned and likewise the upper and lower surfaces of the mounting disc 42 are tinned around the peripheries of the openings 63 and 84 in the mounting disc 42. Moreover, the peripheral and central terminals 73 and 74 of the capacitor 62 are also tinned.

Accordingly, the assembly operation is carried out readily by placing the condenser 62 in a suitable jig having pins and recesses adapted to locate the mounting disc 42 with respect to the lower condenser 62 so that the opening 63 in the disc 42 will be coaxial to the opening 153 in the condenser 62. The condenser 61 is similarly mounted but upon the upper surface of the mounting disc 42, being located by the same or another suitable jig. The diode supporting sleeve 66 is mounted and similarly held upon the upper surface of the top armature 69 of the ceramic condenser 61. Heat is then applied to the mounting disc 42 around the outer peripheries of the terminal 73 of the condenser 62 and the lower leaf or plate 71 of the condenser 61 causing the solder to flow and to unite the condensers 61 and 62 mechanically and electrically to the mounting plate 42. Heat is also applied to the diode support 66 causing the solder to flow and unite the flange 68 to the upper plate or silver leaf 69 of the ceramic condenser 61. The condenser plates 69 and 71 are annular, having openings 161 and 162 therein surrounding the opening 154 in the ceramic body so that they are insulated from each other and from the diode lead 75 as shown. Likewise the opening 63 in the metallic mounting disc 42 is at least as large as opening 154 in the ceramic body of the condenser 61 and greater in diameter than the maximum diameter of the conducting portion of the annular or central eyelet terminal 74 of the condenser 62 so that the central terminal 74 is well insulated from the metallic mounting plate or disc 42. The plug 155 has a reduced diameter end received within the eyelet terminal 74 and providing an annular shoulder 163 locatingly engaging the eyelet flange or end face. Thereafter the diode 64, assembled with its insulating collar 98, is pushed downward into the sleeve 66 with the lead 75 of the diode 64 extending downwardly through the opening 154 in the condenser 61 as well as the openings 63 and 153. An annular plug 155 with a connection tab may be pushed over the lead 75 and into the opening 153 in the capacitor eyelet for centering and holding the lead, the plug being soldered to the lead 75 and the terminal 74.

The subassembly consisting of the mounting disc 42 with the condensers 61 and 62, the diode support 66, the diode 64 and the resistor mounting cup 85 then is carried to the next assembling stage where as a succeeding subassembly operation the resistor 58 is inserted into the holding cup 85. The resistor lead 57 is projected through the opening 88 of the holder 85 and soldered to the holder neck by a globule of solder indicated at 151, the projecting tail or end of the lead 57 being clipped off.

The next operation is pushing the capacity adjusting telescoping sleeve 91 over the insulator 58 and into the cup 85. The insulator cap 92 may also be placed. Another preassembling operation consists of winding a coil 76 upon the insulator form 77. Alternatively, in the case of an instrument designed for higher frequencies a single or two turn loop of wire may be formed to suitable shape with leads adapted for electrical connection to the tabbed plug 155 on the lead 75 of the diode 64 and to the lead 94 of the resistor 58. In the particular construction shown for the sake of illustration, and shown to enlarged scale in Figs. 14 and 14-A, the wire of the coil 76 is so wound on the form 77 as to leave a protruding lead 109 from which the insulation has been removed and which has been tinned and likewise a lead 95 from which the insulation has been removed and which has been tinned. The preassembled coil structure is then secured to the mounting disc 42 by means of the cap screws 82 passing through openings 157 in the mounting disc 42 as shown in Fig. 7 and received in the threaded openings 81 in the legs 79 of the coil mounting form 77 as shown in Fig. 11. Thereupon the electrical connections are made to the leads 109 and 95 of the coil 76. In making the electrical connection to the lead 109 a pencil soldering iron may be so held as to cause a flow of solder between the lower end of the lead 75 which has been clipped off and the plug 155 in the condenser opening 153 and also in the junction between the edges of the plug 155 and the central eyelet terminal 74 of the condenser 62 as shown at 158 and 159.

It will be understood that if desired the button condenser 62 may also be constructed with a relatively small opening for the lead 75 in lieu of the relatively large opening 153 and the electrical connection from the lead 109 may be made directly to the lead 75 and to the condenser central terminal 74 by a single globule of solder which flows along the wire 109 and into the space between the lead 75 and the inner condenser terminal 74, being held there by capillary action until solidified. Specific connecting arrangements have been described for the sake of illustration. However, the invention is not limited thereto and does not exclude the use of a button mica capacitor as the condenser 62 already furnished with a soldering lug to which the lead 109 may be soldered, the rectifier lead to be separately soldered in the central terminal 74.

Preferably, for protecting the resistor 58, the ceramic cap or collar 92 is slipped over the lead 94 before the leads 94 and 95 are soldered together. It will be understood that, where balancing tabs 96 are desired, these have already been mounted on the coil form assembly and are soldered or otherwise electrically connected to the lead 94 when the lead 95 is soldered thereto.

From the foregoing it will be apparent that all of the structure illustrated in Fig. 14 constitutes a unitary subassembly, electrically complete, readily connected and accurately made in successive assembly line steps by operators required to learn only relatively few and simple operations. Moreover, it is apparent that where changes in electrical characteristics of any of the parts are required for various wide ranges of frequency, a resistor 58 of different value may be used for different detector ratings or frequency, and different numbers of coil turns for the coil 76 may be used as well as various capacities of the condenser 61 and 62 which may be required for different ratings of instruments. All this may be taken care of by the supply of components of suitable electrical value to the assembly line operators; and the subassembly illustrated in Fig. 14 may be of the design required for any desired frequency range or rating without interfering with the further assembly operation of mounting the subassembly of Fig. 14 in the cylinder body 31 of Figs. 6 and 7, for example.

The next assembly operation may be the insertion of subassembly Fig. 14 in the hollow body 31 together with other parts. Referring to Figs. 6, 7 and 11 this assembling operation consists of stacking the insulator 39, the connector plate or strip 41 and the insulator 43 in the elongated or roughly oval chamber 28 in the body 31 which is inverted for the purpose so that the parts named are held together by gravity while the screw 44 is inserted. Then follows the insertion of the subassembly of Fig. 14 in the circular chamber 27 in the body 31 so that the mounting disc 42 is surrounded by the skirt 25. The subassembly of Fig. 14 is secured by the screws 47 and 48.

It will be observed that when the connection strip or plate 41 is placed against the insulator 39, the struck up tab 104 passes through aligned openings 164 in the insulator 39 and 165, in the transverse body wall 49. The connection strip 41 is located and confined within the insulator strip 43, fitting within the pocket formed between side ridges 166 of the material of the insulator and which are shown more clearly in Fig. 13. When the subassembly of Fig. 14 is mounted, the diode 64 passes through opening 167 in the insulator 43, through open space 168 in the connection strip 41, through the opening 53 in the insulator 39, and through an opening 169 in the transverse web 49 of the hollow body 31.

After the subassembly of Fig. 14 has been secured in place the body 31 is turned right side up to the position shown, say, in Fig. 6, and the parts of the cartridge U above the web 49 in the hollow body 31 may be assembled. As shown in Fig. 5, the standoff insulator 51 is secured in the opening 172 by staking or soldering the retaining ring or cup 171 in which the glass insulator button 52 is molded. The top surface of the web 49 may be staked around the opening 172 in a preliminary operation.

Before assembling the rectifier load resistor 56, its leads 55 and 105 are bent to the shape shown. The resistor 56 is then laid in place. The end of the lead 105 is soldered to the tab 104 of the connection strip 41. Then the flexible lead 101 from the rectifier 64 and the resistor lead 55 are simultaneously soldered to the connection post 54 of the standoff insulator 51. Since strip 101 is flexible, no strain of any kind is placed upon the diode rectifier 64, but the resistor 56 is securely supported by independently and rigidly mounted members 104 and 54.

By utilizing the shim stock brass ribbon conductor 101 as the connection between the diode rectifier 64 and the standoff post 54 to which the lead 55 of the resistor 56 is connected the rod or wire lead 102 of the diode can be snipped off short, as shown. In this manner induction effects that would characterize the circular sectioned lead 102 are avoided. Furthermore, the snipping off of the lead 102 and relieving it of strain that would otherwise result from using it to connect the diode to the resistor eliminates displacement and interference with the adjustment of the semiconductor pellet 135 to which the lead 102 is rigidly secured. If desired, jig locating openings 173 and 174 may be provided in the mounting disc 42 as shown in Fig. 10. If the openings 173 and 174 are provided in the disc 42, registering openings 175 and 176 may also be provided in the web 49 of the hollow member 31. After the assembly has been completed the openings 173 and 174 may be employed to admit a suitable tool for adjusting the positions of the balancing tabs 97.

For receiving the screws 34 and 35 to secure the protective insulator cup 111, counter-bored holes 177 and 178 (Fig. 5) are provided in the web 49. Openings 179 and 180 registering with the holes 177 and 178, respectively, are provided in the mounting disc 42. The threaded hole 181 for receiving the flat head screw 48 in the body web 49 is shown in Fig. 5. A corresponding threaded hole for receiving the flat head screw 47 is not visible in Fig. 5 for the reason that the upper portion of the hole has been counterbored to form the socket 172 for the standoff insulator 171, as shown in Fig. 8.

After the protective plastic insulating cup 111 and the parts shown in Fig. 5 have been assembled, the cap 32 may be secured by means of the screw 33 and the assembly of the cartridge U is completed. As shown in Figs. 6 and 11 the cap 32 is recessed at 183 in order to provide adequate clearance for the detector 64. A suitable index or marking, not shown, is provided in a depression 184 in the knurled rim 114 of the head 32 for indicating the directivity or angular position of the cartridge U in the mounting 20.

It will be apparent that the cartridge U is interchangeable with other cartridges for other frequencies or other frequency ranges and accordingly the standing wave detecting system illustrated in Fig. 1 is readily adapted for measurements over wide ranges of frequencies. When any cartridge U is to be mounted in its socket 21 in the mount 20, the latch 148 is retracted manually to the broken line position of Fig. 3 to permit the cartridge U to be inserted and is then returned manually to the position shown in Fig. 3.

The notch 191 in the top edge of the hollow body 31 and the pin 115 in the flange 38 of the cap 32 locate the knurled knob 114 and prevent it from rotating with respect to the body 31. The pin 115 protrudes far enough to cooperate with one or the other of the pair of shoulders 116 formed in the structure 20 which limit the rotation of the cartridge U to 180°. The position of the shoulders 116 is so chosen in relation to the position of the contact button 132 on the spring finger 131 that one or the other of the contact projections 106 or 107 of the connection strip 41 makes contact with the contact button 132 when the cartridge U is in position with the latch 148 holding it down and in one or the other of its extreme angular positions. However, with the cartridge U in any other angular position or not properly seated in the opening 21 neither of the projections 106 or 107 makes electrical contact with the instrument G through the contact button 132 and the spring finger 131. In this manner any possibility of erroneous readings is eliminated. The only positions of the cartridge U for which readings can be obtained in the instrument G are those in which the catridge U is in either of its alternative positions with the electromatic induction or pick-up coil 76 parallel to the axis or center line of conductor 10 and in proper position to receive forward wave energy or in the opposite position to receive reflected wave energy traversing the transmission line L.

The condensers 62, 61 and 122 correspond to the condensers "C–1" and "C–2" and "C–3" in the aforesaid co-pending application Serial #344,542. The electrical circuit relationship between the parts of the improved structure, described and illustrated in the present application, is shown in Fig. 12. The capacity C of the equation in column 2, line 45 of the application is represented schematically in Fig. 12 by dotted line representation of a capacitor since the capacity in question is actually the capacity between the element 76 of the pick-up unit U and the center conductor 10 rather than a separate capacitance element or condenser. The resistance R of the same equation is the resistance of the resistor 58. The electrical energy intercepted by the pick-up unit including the effective capacity C, the mutual inductance M formed by the coil 76 in relation to transmission line unit L and the load resistor R is applied through a circuit including the resistor R and the diode rectifier unit 64 to the charge condenser 61. The circuit is completed through the grounded or metal parts including the outer conductor 1 with its pick-up unit support S and the cylindrical body 31 of the cartridge U. The potential to which the charge condenser 61 is charged represents the peak value of the voltage induced in the pick-up circuit and by suitable calibration this value is representative of the energy. Since the condenser 62 shunts the diode 64, the band of frequencies to which the apparatus is accurately responsive is broadened. The by-pass condenser 122, serves to by-pass any radio frequency energy which might otherwise be delivered through the diode leading resistor 56 to the galvanometer G, which is a direct-current instrument. The distributed capacity across the sampling resistor R produced by the telescoping sleeve, 91, is represented in Fig. 12 by the capacity elements C–4.

In accordance with the patent statutes the principles of the present invention may be utilized in various ways, numerous modifications and alterations being contemplated, substitution of parts and changes in construction being resorted to as desired, it being understood that the embodiment shown in the drawings and described above and the particular method set forth are given merely for the purpose of explanation and illustration without intent to limit the scope of the claims to the specific details disclosed.

What we claim and desire to secure by Letters Patent of the United States is:

1. In a high frequency electrical system for detecting wave signals on a transmission line having a tubular conductor, said system being of the type comprising an indicator and detector circuit means providing coupling between the indicator and the line, the improvement in the detector circuit means which comprises in combination a support for mounting on and with an axis perpendicular to the tubular conductor, and a pickup detector unit carried by the support for facile removal and replacement along said axis, the pickup detector unit and the support being formed complementally as a plug and socket combination including locating means for positioning the unit in predetermined relation to the support in assembly, said unit comprising a hollow body with a transverse wall, a plurality of relatively thin flat conducting and insulating elements including a conductive mounting disk disposed within the body in alternating relation to one another, a plurality of said elements comprising a contact assembly unit and including a conductive contact strip, first fastener means holding said contact assembly unit to and in the body, the elements of said contact assembly unit being formed with aligned through openings in the provision of a rectifier recess, a rectifier in said recess secured to and generally on one side of said mounting disk, a resistor on the other side of the disk and wholly supported thereby, said mounting disk together with the rectifier and the resistor comprising a sub-assembly adapted to be received in and removed from the body as a unit, second fastener means independent of said first fastener means holding said sub-assembly to and in the body, circuit components including said rectifier and said resistor connected together in a pickup network, said network being connected to the mounting disk and to another conductive one of the elements whereby the said one element and the mounting disk constitute network terminals for connection of the network to an indicator, and conductor means carried by the support block for contacting the conductive elements and connecting the latter to the indicator.

2. In a high frequency electrical system for the detection of wave signals on a transmission line having a tubular conductor, said system comprising an indicator and detector circuit means providing coupling between the indicator and the line, the improvement in the detector circuit means which comprises in combination a support on the tubular conductor and a pickup detector unit carried by the support for facile removal and replacement, the pickup detector unit and the support being formed complementally as a plug and socket combination including locating means for positioning the unit in predetermined relation to the support in assembly, said unit comprising a hollow body with a transverse wall and a skirt, a mounting disk mounted within said skirt and electrically connected to the wall, a connection strip mounted between one side of said disk and said transverse wall, insulating strips separating said connection strip from said wall and said mounting disk, means securing the connection strip and the insulating strips to the hollow body independently of the mounting disk to permit removal and replacement of the latter with the strips secured, said hollow body having diametric openings, said connection strip having projecting ears within said openings spaced from and insulated from the said hollow body, said connection strip and said insulating strips all being elements within said skirt, such elements and said transverse wall being formed with aligned openings in the provision of a rectifier recess continuous through the elements, a rectifier in said recess and disposed wholly on said one side of said mounting disk, a resistor on the other side of said mounting disk and wholly supported thereby, circuit components including said rectifier and said resistor connected together in a pickup network, said network being connected to said connection strip and said mounting disk whereby said connection strip and said hollow body constitute network terminals for connection of the network to an indicator, and conductor means carried by the support block for contacting the connection strip at one of said projecting ears and connecting it to the indicator.

3. A chassis for an interchangeable high frequency pick-up unit for a hollow detector cartridge in a wave signal detector system comprising in combination a mounting disk having a pair of openings therein, a cup for supporting a sampling resistor mounted in one of said openings projecting wholly on one side of said disk with an axis perpendicular to said disk, having an opening for receiving a resistor terminal and connecting it electrically to the disk; first and second annular condensers mounted on either side of said disk coaxially with the second opening, each having a first terminal electrically connected to said disk and a second terminal insulated therefrom, both condensers having an opening adapted to have a rectifier terminal rod extend therethrough without contact therewith, the first condenser being on the opposite side of said disk from said resistor supporting cup, a rectifier supporting sleeve secured co-axially with the said second disk opening on the side of said disk away from said resistor supporting cup and electrically connected to the second terminal of the first condenser, whereby a sampling resistor and a wave pickup element may be mounted on the same side of the disk as said resistor supporting cup in serial relation to a rectifier having a terminal rod extending through the openings in said condensers and the second opening in the mounting disk.

4. A pickup unit for attachment to the tubular conductor of a high frequency electrical line to couple an indicator to such line, said unit comprising a conductive hollow body with a transverse wall and a shielding skirt depending from said wall, a subassembly-supporting mounting disk mounted within said skirt electrically connected to the transverse body wall, a plurality of insulating and conducting elements interposed between said transverse wall and said mounting disk in alternating relation, circuit components including rectifier means, capacitor means and resistor means carried by the mounting disk, shielded by said skirt and connected together in a pickup circuit, said circuit being connected to a conductive one of the interposed elements and to the conductive hollow body whereby the one element and the said body constitute circuit terminals for connection to the circuit of an indicator, and means securing the elements to the body independently of the disk to permit stepwise assembly first of the elements to the body and second of the disk to the body and to permit stepwise reverse order disassembly in service and repair.

5. In a high frequency electrical device for measuring wave signals on a transmission line having coaxially arranged inner and outer conductors, a pickup unit comprising a hollow conductive metal body having an axis, a transverse wall in said body substantially normal to the said axis, said wall serving to form a first cavity on one side of the transverse wall and a second cavity on the other side, a mounting disk extending transversely in the second cavity for facile removal from and replacement in and relative to the body and the transverse wall, the wall being fixed in place in the body independently of the disk, rectifier means supported by the mounting disk extending through said wall, connecting means between said transverse disk and said transverse wall, insulated therefrom and having a tab projecting through the transverse wall, a rectifier-loading resistor connected between said rectifier and said tab in the first cavity, a wave pickup element on said mounting disk in said second cavity and projecting therefrom, connected to said rectifier, said second cavity having a lateral opening through the hollow body providing access to said connection strip for an indicator connection.

6. A detector cartridge for a standing wave indicator adapted to be received in a cylindrical socket; said cartridge comprising in combination a cylindrical body having a transverse wall, a first cavity on one side of the wall, a second cavity on the other side of the wall with first and second chambers; a mounting disk mounted in the second cavity at the margin between the two chambers, closing the first chamber and making electrical contact with the transverse wall; a radial opening being in said hollow body providing access to the first chamber; a connection strip in said first chamber electrically insulated from said body having a projection extending through said radial opening and having a tab extending through the wall in insulated relation to the latter and into the first cavity; a rectifier supported by the mounting disk having first and second terminals, the first extending through the transverse wall and the second through the mounting disk electrically insulated therefrom; connecting means between the first rectifier terminal and the connection-strip tab in the first cavity; inductive pickup means mounted on the mounting disk, projecting from the second chamber, connected to the mounting disk and the second terminal of said rectifier, and condenser means mounted on either side of said mounting disk in electrical relation to said rectifier for enabling an indication of the magnitude of high frequency electrical energy in the circuit of said inductive pickup means to be obtained from a connection between the body of said cartridge and the projection from the connection strip.

7. A detector cartridge for a standing wave indicator adapted to be received in a cylindrical socket, said cartridge comprising in combination a cylindrical body having a transverse wall dividing the body into first and second cavities with the second cavity having a first and a second chamber, a mounting disk, mounted in the second cavity at the margin of the first and second chambers for facile removal from and replacement in and relative to the body and the transverse wall, the wall being fixed in place in the body independently of the disk, a rectifier carried by said mounting disk extending through said first chamber into the first cavity, said body having a radial opening, connecting means insulated from said body extending through said opening from said rectifier, and inductive pickup means supported by said mounting disk extending from the second chamber for exposure to electro magnetic waves to be detected, said pickup means being connected to said rectifier whereby the unidirectional voltage between said body and the connecting means in the radial openings of said body is responsive to electrical energy received by said pickup means.

8. A detector cartridge for a standing wave indicator adapted to be received in a socket, said cartridge comprising in combination a hollow body, having a transverse wall and a skirt, a mounting plate mounted within said skirt for facile removal from and replacement in and relative to the body and the transverse wall, the wall being fixed in place in the body independently of the plate, said hollow body having a lateral opening, a connection strip mounted between said plate and said wall insulated from each, having an ear within said opening, spaced from said hollow body and electrically insulated therefrom, said plate and said transverse wall being formed with aligned openings in the provision of a rectifier recess through the transverse wall, a rectifier in said recess and disposed wholly on one side of said mounting plate, a resistor on the other side of said mounting plate and wholly supported thereby, circuit components including said rectifier and said resistor connected together in a pickup network, said network being connected to said connection strip and said mounting plate whereby said connection strip and said plate constitute network terminals for the connection of the network to a direct-current indicator external to said cartridge.

9. A detector cartridge for a standing wave indicator adapted to be received in a conducting socket having insulated contacting means, said cartridge comprising in combination a body having a transverse wall, a first cavity on one side of the wall, a second cavity on the other side of the wall with first and second chambers; a mounting disk mounted in the second cavity at the margin between the two chambers for facile removal from and replacement in and relative to the body and the transverse wall, the wall being fixed in place in the body independently of the disk, closing the first chamber; a lateral opening being in said hollow body providing access to the first chamber; a connection strip in said first chamber, electrically insulated from said body, having a projection extending through said lateral opening and having a tab extending through the transverse wall; a rectifier supported by the mounting disk, having a terminal with connecting means to the connection strip tab in the first cavity; inductive pickup means mounted on the mounting disk, projecting from the second chamber, connected to the mounting disk, and to the rectifier; the mounting disk being secured to and electrically connected to the hollow body, whereby the connection strip and the hollow body make electrical contact with the socket and the contact means therein for producing between said socket and said contact means an electrical indication of the magnitude of high frequency electrical energy in the circuit of said inductive pickup means.

10. An interchangeable high frequency pick-up unit for a hollow detector cartridge in a wave signal detector system; said unit comprising in combination a mounting disk having a pair of openings therein; a sampling resistor with a pair of terminals, one of which extends through one of said openings in said disk and is electrically connected thereto; a supporting sleeve for said resistor electrically connected and secured to said disk coaxially with said first mentioned opening; first and second annular condensers mounted on either side of said disk coaxially with said second opening, each having a first terminal electrically connected to said disk and a second terminal insulated therefrom, the first condenser being on the opposite side of said disk from said resistor; a rectifier supporting sleeve coaxially secured to and electrically connected to the second terminal of the first condenser; a rectifier having a coaxial terminal shell and a terminal rod, said shell fitting in and making electrical contact with said rectifier supporting sleeve and said terminal rod extending through said condensers and making electrical connection with the second terminal of the second condenser; an inductive pickup element electrically connected between said resistor and the terminal rod of said rectifier and mounted on said disk on the same side thereof as said resistor, whereby said rectifier, inductive pickup element and resistor are connected in serial circuit relationship and the entire unit is adapted for mounting in a hollow cartridge with the pickup element exposed to electrical wave energy and the rectifier adapted to be shielded by such a cartridge, and the elements of the pickup unit may be assembled and electrically connected before assembly with the remainder of the detector cartridge.

11. A detector cartridge for a standing wave indicator adapted to be received in a socket providing rotation of 180°, said cartridge comprising in combination a cylindrical body having a transverse web and a substantially oval or elongated cavity in said web transverse to the cylindrical axis with a depending skirt portion below the elongated cavity, said web having openings therein, an insulating strip adapted to be received in the web cavity, a connection strip having a connection tab bent out from the center to form a rim of conductive material and an elongated opening surrounded by the rim, the connection tab projecting transversely to the strip, said connection strip fitting inside the elongated cavity with the tab protruding through one of the openings of said hollow body web, said cylindrical body having transverse notches or slots 180° apart in the cylindrical walls thereof for receiving the ends of said connection strip without making electrical contact therewith, a second insulating strip lying in said cavity against the connection strip and having peripheral rims fitting around the connection strip to locate it in the cavity and prevent it from making electrical contact with the hollow body, means securing the last mentioned insulating strip against said web for supporting both insulating strips and the connection strip, a mounting disc of conducting material with openings therein mounted within said skirt of the hollow body and spaced from the connection strip in said cavity in the hollow body, said mounting disc forming a support for a subassembly, said subassembly comprising, together with the mounting disc, a pair of annular condensers, one mounted above, the other below the mounting disc, coaxial with an opening in the mounting disc, a detector mounting sleeve secured to the upper annular condenser, a detector supported in said sleeve having a cylindrical conductor shell forming one terminal and making electrical connection with the said sleeve and said upper condenser and having a pin terminal coaxial therewith extending through both condensers and the said opening in the mounting disc for making electrical contact with the terminal of the second condenser on the side thereof away from said mounting disc, said mounting disc having a second opening, a resistor support mounted therein, a resistor mounted in said support having a terminal lead secured to said support and electrically connecting the resistor to the mounting disc through said support and having a second terminal lead, an inductive pickup member secured to said mounting disc in insulated relation with respect thereto, having one end terminal connected to a second terminal of said resistor and a second terminal connected to the pin terminal of said detector, said web having an opening receiving a standoff insulator with a connection post, a flexible lead making electrical connection with the terminal shell of said detector and said standoff post, and a second resistor, a rectifier load resistor, having a pair of terminal leads serving as supporting members, one such lead electrically connected and secured to the tab of said connection strip and the other such lead electrically connected and secured to said standoff insulator terminal post, whereby the inductive pickup coil and the capacitative effect of the lower side of said coil provide inductive and capacitative pickup in circuit with the first resistor in either additive or substraction relation, depending upon the angular position of the cartridge with respect to an electromagnetic field to be detected, the upper condenser serves as a charge condenser for the rectifier to enable it to give indications on the peak reading principle, the lower condenser serves as the frequency-band broadening condenser, and the second resistor serves as a rectifier loading resistor adapted to be connected to an indicator through one of the ends of said connection strip and the metal hollow conductive body.

12. A connector fitting and coaxial line outer conductor body block assembly for interconnecting a high frequency detector unit having a lateral connecting lug and a coaxial direct-current galvanometer line having a connector socket, the assembly comprising a body block formed with a socket for receiving such a detector unit and an access aperture communicating with the body block socket, the received unit being rotatable to different relative positions in the body block socket, said connector fitting comprising in combination, an externally threaded hollow cable connector unit mounted on the body block and attachable to the connector socket, said connector unit having a shoulder radially extending inward, an annular condenser having a peripheral terminal contacting said shoulder and a central terminal, a conductor rod, electrically connected to the central terminal of said condenser, with an external knob serving for connection to the central terminal of a coaxial galvanometer line, insulated means securing the condenser against said shoulder, and a spring finger secured to said conductor rod at one end and having a free end extending into the access aperture and adapted to make electrical contact with the said connection lug of the high frequency detector unit.

13. Apparatus as in claim 5 wherein a stand off insulator is mounted in said transverse wall, a connection post is fast in said insulator and projects into the first cavity, a flexible conductor is connected in said first cavity between the rectifier and the connection post, and the load resistor is connected between said connection post and said tab of the connecting strip for supporting the load resistor without mechanical strain on the rectifier.

14. A detector cartridge as in claim 11 wherein the support for the first mentioned resistor is in the form of a tube surrounding one end of the resistor to provide distributed capacity and a sleeve is fitted in telescopic relation to said tube, the sleeve being slidable for adjusting the distributed capacity in the circuit of said first mentioned resistor according to the magnitude of the resistance thereof for giving broad band characteristics to the detector.

15. A detector cartridge for attachment to the tubular conductor of a high frequency electrical line to couple an indicator to such line, said cartridge comprising in combination a hollow conductive body having one piece surrounding wall and oppositely directed open ends, the body having a transverse web between and spaced from both such ends and dividing the interior of the body into first and second cavities opening respectively through the opposite ends of the body, said web being formed with a recess chamber continuous with and of less cross sectional area than one of said cavities, the surrounding wall of the body being formed with diametrically related apertures communicating with the recess chamber, said apertures being located between and spaced from the ends of the one piece body wall, a connection strip disposed in the web recess chamber and having contact terminals projecting through the apertures in the surrounding wall of the body, insulating means within the recess chamber and separating the connection strip from the body, a pick up circuit including components within each of the cavities and supported by the body, and means electrically connecting the circuit to the conductive body and to the connection strip for facile electrical connection of an indicator to the circuit through the body and one of the projecting terminals of the connection strip.

16. A plug in pick up unit for insertion in a socket in the outer conductor of a tubular electrical transmission line to couple an indicator circuit to the line, said unit comprising a hollow conductive body having oppositely directed open ends and a fixed transverse wall spaced from both ends and dividing the body interior into separate cavities, a rectifier extending through the fixed body wall from one cavity to the other, means in said one cavity removably secured to the body and supporting the rectifier for removal and replacement relative to the fixed wall, a wave pick up, means in said one cavity secured to the body and to the pick up and supporting the latter in projecting relation through one of the open ends of the body, a plurality of capacitive and resistive elements within the body, at least one such element being in each of the cavities, said resistive and capacitive elements being connected together and to the rectifier and the wave pick up in a detector circuit, and connector means supported by the body in insulated relation and electrically connected to the detector circuit, said connector means providing an insulated terminal on the outside of the body for connecting the detector circuit to said indicator circuit.

17. A plug in pick up unit for insertion in a socket in the outer conductor of a tubular electrical transmission line to couple an indicator circuit to the line, said unit comprising a hollow conductive body having oppositely directed open ends and a fixed transverse wall spaced from both ends and dividing the body interior into separate cavities, said fixed wall being formed with a through opening communicating the cavities, a mounting plate extending across one of the cavities and secured to the body for facile removal and replacement, a rectifier carried by the plate and extending through the wall opening into the other body cavity, the rectifier being removable and replaceable with the plate as a unit and being withdrawable from and insertable into the opening in the fixed wall during such removal and replacement, a wave pick up, means in said one cavity secured to the body and to the pick up and supporting the latter in projecting relation through one of the open ends of the body, a plurality of capacitive and resistive elements within the body, at least one such element being in each of the cavities, said resistive and capacitive elements being connected together and to the rectifier and the wave pick up in the detector circuit, and connector means supported by the body in insulated relation and electrically connected to the detector circuit, said connector means providing an insulated terminal on the outside of the body for connecting the detector circuit to said indicator circuit.

References Cited in the file of this patent

UNITED STATES PATENTS

| | | |
|---|---|---|
| 2,425,834 | Salisbury | Aug. 19, 1947 |
| 2,588,390 | Jones | Mar. 11, 1952 |
| 2,630,473 | Woodward | Mar. 3, 1953 |
| 2,636,120 | Bird et al. | Apr. 21, 1953 |
| 2,663,753 | Bird | Dec. 22, 1953 |
| 2,700,749 | Bird | Jan. 25, 1955 |
| 2,702,368 | Bird | Feb. 15, 1955 |

FOREIGN PATENTS

| | | |
|---|---|---|
| 864,128 | Germany | Jan. 22, 1953 |

UNITED STATES PATENT OFFICE
CERTIFICATE OF CORRECTION

Patent No. 2,891,221 June 16, 1959

James R. Bird et al.

It is hereby certified that error appears in the above numbered patent requiring correction and that the said Letters Patent should read as corrected below.

Column 2, line 11, strike out "positioned in the plane of the inner conductor of the line." and insert instead -- and capacitance C connected across the transmission line --; same column 2, line 70, for "pacacitance" read -- capacitance --; column 16, line 69, for "catridge" read -- cartridge --.

Signed and sealed this 26th day of December 1961.

(SEAL)
Attest:

ERNEST W. SWIDER
Attesting Officer

DAVID L. LADD
Commissioner of Patents
USCOMM-DC